United States Patent
Burch et al.

[11] 3,813,146
[45] May 28, 1974

[54] LIGHT BEAM ALTERNATOR HAVING A SINGLE ROTATING MIRROR

[75] Inventors: Darrell E. Burch, Orange City; Francis J. Gates, Costa Mesa; David A. Gryvnak, Orange City; John D. Pembrook, Costa Mesa, all of Calif.

[73] Assignee: Philco-Ford Corporation, Blue Bell, Pa.

[22] Filed: May 4, 1973

[21] Appl. No.: 357,217

[52] U.S. Cl.............. 350/285, 350/169, 350/274, 356/205, 356/207, 356/229
[51] Int. Cl............................................. G02f 1/34
[58] Field of Search ........... 350/285, 274, 169, 99; 356/204, 205, 207, 213, 229; 250/336

[56] References Cited
UNITED STATES PATENTS
3,455,637 7/1969 Howard ............................ 356/204

Primary Examiner—Ronald L. Wibert
Assistant Examiner—Paul K. Godwin
Attorney, Agent, or Firm—Robert D. Sanborn; Gail W. Woodward

[57] ABSTRACT

A single rotating mirror is combined with a plurality of fixed mirrors to provide an alternating optical path. The entrance and exit beams can be made quite narrow and are not varied as the device switches between two alternate equal-length internal paths. Such an alternator has application in optical measurement systems where it may be desired alternately to illuminate a pair of reference light absorption cells.

9 Claims, 11 Drawing Figures

LIGHT BEAM ALTERNATOR HAVING A SINGLE ROTATING MIRROR

BACKGROUND OF THE INVENTION

Optical absorption analysis has become a widespread and useful tool for evaluating gases. For example, in pollution measurement and control systems it is frequently essential that quantitative measurements be made rapidly and accurately of the pollutants of interest. In such a system, analysis of a chemical process, such as combustion, is carried out continuously by monitoring the reaction products. If desired the process can be controlled to produce a specific effluent. Such measurements must often be made in the presence of interfering gas species and particulate light scatterers.

Typically, two optical channels are employed with energy from a single light source alternately applied to the two channels. Differential transmission is employed to provide a sensitive measure of the composition of the transmission media in the two channels. In the prior art it has been a common practice to employ a chopper located in close proximity to an optical source alternately to obscure first one channel and then the other. The source must have sufficient area evenly to illuminate both channels. If, instead, a small or narrow beam source is employed, it must first be optically converted to cover a suitably large area. Alternatively the channels can be arranged in non-parallel fashion so that a wide angle source can be used for equal illumination. Other alternatives include beam splitting optics, beam diverting optics, or multiple sources. All of the above methods have substantial drawbacks. Either large losses are encountered or very complicated optical systems must be employed to control and collimate the optical energy. These are difficult to adjust and tend to produce drift problems in operation. In the multiple source approach, uncontrolled differential brightness creates a substantial problem.

SUMMARY OF THE INVENTION

It is an object of our invention to provide a light beam alternator having only a single rotating mirror.

It is a further object to provide a light beam alternator that alternates a common input beam between two intermediate beam paths having substantial spatial separation, and then reforms the separated paths into a common output beam path.

It is a still further object to incorporate a high frequency light beam chopper into a light beam alternator of lower frequency.

These and other objects are achieved by means of a rotating sectored mirror disposed within an array of fixed mirrors so arranged that the input light beam, as it is reflected between mirrors of the array, must encounter the plane of the rotating mirror at least twice. This causes the optical path between the fixed mirrors to alternate between two separate regions of space. In a preferred embodiment, a serrated mask or a series of notches is incorporated into the rotating mirror to provide a high frequency light beam chopping action.

DESCRIPTION OF THE INVENTION

Figure 1:
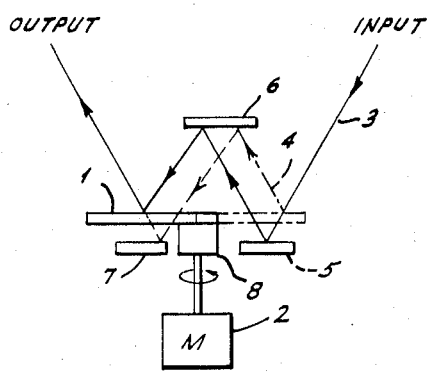
FIG. 1 is a schematic showing of one form of light beam alternator.
Figure 2:
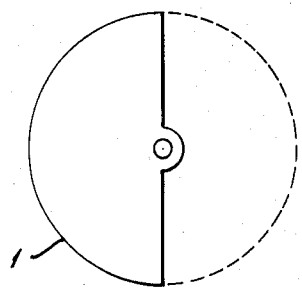
FIG. 2 is a front view of the rotating mirror of FIG. 1.

FIG. 1 shows the light beam alternator in its elementary form. Half-circular, alternator mirror 1 rotates about an axis perpendicular to its reflective plane and is driven by motor 2. Alternator mirror 1 is a front surface reflector, desirably a highly polished, flat, metal plate usually provided with a corrosion-resistant metal coating such as chromium or aluminum. The solid lines show the mirror in one position and the dashed lines show the mirror rotated 180 degrees. FIG. 2 is a front view of mirror 1. Three fixed, front-surface mirrors 5, 6, and 7 are oriented with respect to mirror 1 as shown. Mirrors 5 and 7, while shown as separate, could be a unitary mirror having a slot or hole to accommodate the motor shaft. Solid line 3 represents an optical beam entering the system as shown by the arrow. When alternator mirror 1 is in the position of the solid lines, beam 3 first strikes mirror 5 and is reflected to mirror 6. Mirror 6 reflects the beam to alternator mirror 1 whereupon it is reflected out of the device. When mirror 1 is rotated to its dashed position, the input beam is reflected by mirror 1 along the dashed line 4 to mirror 6. Mirror 6 then reflects the beam to mirror 7 whereupon the beam leaves the device along the same path previously mentioned. It can be seen that, exterior to the device, the input and output paths are identical. Within the device there are two alternate paths well separated in space but of the same length. These conditions are achieved by making the reflective surfaces parallel to each other and by adjusting mirror 1 perpendicular to its axis of rotation.

Figure 3:
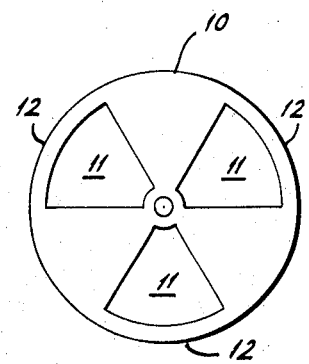
FIG. 3 is a preferred mirror structure.

The rotating mirror 1 of FIG. 1 is mechanically unbalanced and could create vibration problems. Some dynamic balancing could be achieved by making the hub portion 8 so that most of its mass is concentrated in the section opposite the mirror. A better approach is to use a mirror shape as shown in FIG. 3. Mirror 10 has three cut out segments 11 so that each cut out is opposed by a flat mirror surface. Segments 12, which could be omitted if desired, add rigidity to the mirror. This balanced structure can be rotated at relatively high rates and is easily balanced dynamically. Such a structure also has a higher effective frequency. To achieve a 30 Hz alternation rate, the FIG. 1 mirror would have to rotate at 1,800 r.p.m. The FIG. 3 mirror would only have to rotate at 600 r.p.m. to achieve the same 30 Hz rate.

Figure 4:
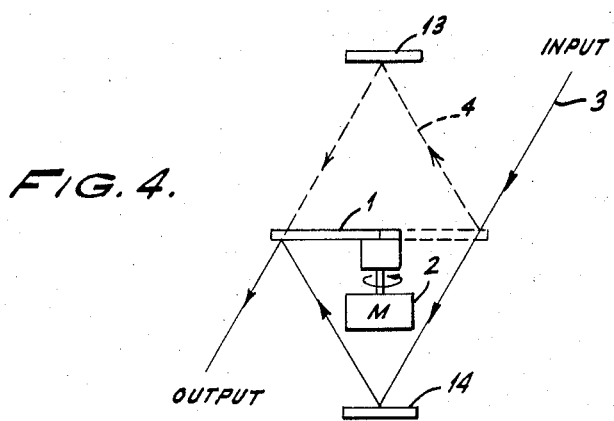
FIG. 4 shows a second, alternative form of light beam alternator.

FIG. 4 shows a light beam alternator of a second, alternative design. Rotating mirror 1 is driven by motor 2 in the manner described above and the mirror is shaped like the one shown in FIG. 2. However, in this embodiment the front and back surfaces of mirror 1 are made parallel and reflective. Front surface mirrors 13 and 14 are centered on either side of mirror 1, are equally spaced therefrom, and parallel thereto. For the position shown, the input beam 3 strikes mirror 14 and is reflected to the underside of mirror 1 whereupon it is reflected to exit along the output beam path. When mirror 1 is in the dashed position the input beam strikes the upper surface of mirror 1 and is reflected to mirror 13 whereupon the beam is reflected along the output beam path. Thus as mirror 1 rotates the beam path is alternated between the paths shown by the dashed and solid lines inside the alternator while the input and output paths are undisturbed. In this embodiment the triple-apertured mirror shown in FIG. 3 could be used, provided that both the mirror faces are parallel and reflective. Obviously, mirrors having an even larger number of apertures could also be used.

Figure 5A:
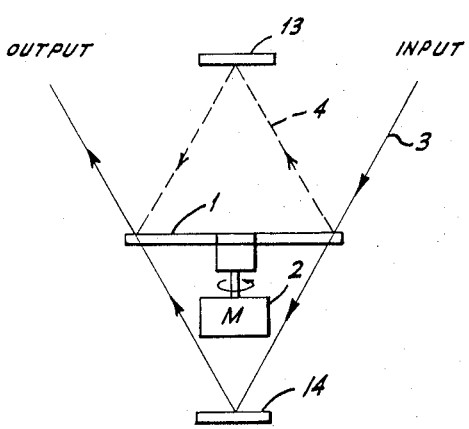
FIG. 5 in part A shows a third, alternative form of light beam alternator and in part B the shape of the rotating mirror.
Figure 5B:
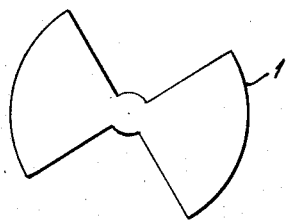

FIG. 5A shows a light beam alternator of a third alternative design. For the design shown rotating mirror 1 is shaped as shown in FIG. 5B and has only its upper surface (the surface facing mirror 13) flat and reflective. Mirrors 13 and 14 are front surface reflectors, each one parallel to the reflecting surface of mirror 1 and equidistant therefrom. When the mirror 1 of FIG. 5A is oriented in the manner shown in FIG. 5B, radiant energy along input path 3 is reflected along dashed line 4 to mirror 13 and is reflected back to mirror 1, whereupon the beam is reflected along the output path. When mirror 1 is rotated 90°, energy passing along path 3 arrives at mirror 14 where it is reflected to and thence along the common output path. Thus as mirror 1 rotates the light beam is alternated between the solid and dashed line paths inside the device. While FIG. 5B shows a two bladed mirror, as many pairs of blades as desired could be employed in a symmetrical structure.

From an examination of FIGS. 1, 4, and 5A, it can be seen that the light beam alternator concept involves reflection from a combination of fixed and rotating mirrors. The input and output paths are the same, but the beam inside the device is alternated between two spatially separate paths. While it is preferred that the two paths be of the same length this is not an absolute requirement. All three embodiments employ multiple reflections from the rotating mirror. In each embodiment the plane of the rotating mirror must be encountered or intersected at least twice to achieve the required characteristics.

Figure 6:
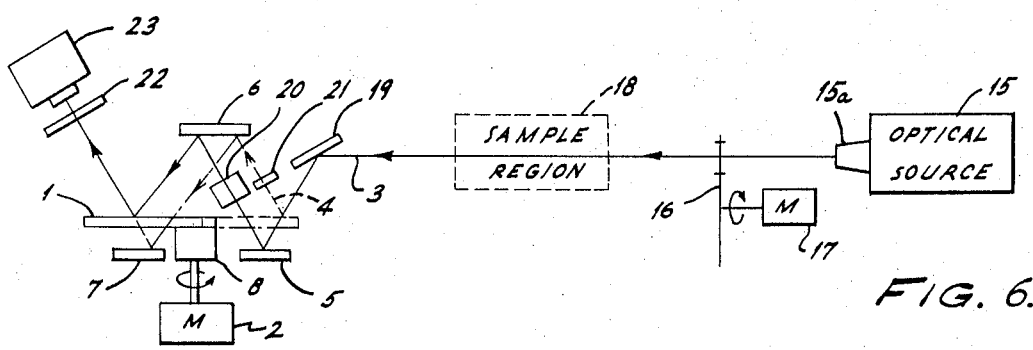
FIG. 6 shows an optical transmission measurement system using the light beam alternator of FIG. 1.

FIG. 6 illustrates an application of the light beam alternator to infrared gas analysis. A radiant source 15 having suitable beam-forming means 15a emits energy over the required spectral band. The band of interest is selected for the gas being measured. Since many gasses, such as carbon monoxide, have absorption line structure in the infrared, this spectral region is often employed. The solid line 3 represents a narrow beam from the source. A conventional chopper 16 driven by motor 17 interrupts or modulates the beam at a relatively high frequency, for example at about 720 Hz. While this chopper could be omitted, its value will be explained hereinafter. The chopped beam is then passed through a sample region 18 where the gas to be measured is contained. This sample region 18 could be a portion of a smoke stack, an exhaust flue, a confined volume inside a sample holder having suitable windows, or it could simply be a volume of space such as the air over a roadway. Mirror 19 directs the beam into the alternator which is similar to that shown in FIG. 1. Fixed mirrors 5, 6, and 7 in combination with rotating mirror 1 provide two alternating paths through the device as shown by the solid and dashed lines. The solid line path traverses selector cell 20 which contains a quantity of the gas to be measured at low pressure. The dashed line path traverses selector cell 21 which contains a quantity of the gas to be measured at high pressure. The selector cells are adjusted in terms of length and gas concentration to have equal average transmission over the transmission band of interest. Selector cell 21 may be replaced by an attenuator with nearly constant transmission over the bandpass of interest. The beam out of the alternator passes through bandpass filter 22 to photo detector 23. Electronic circuitry, not shown, is connected to detector 23 to provide an electronic readout. This readout is related to the quantity of gas to be measured in the sample region. Bandpass filter 22 is selected to cover a portion of the spectrum where the gas to be evaluated has suitable absorption line structure. Photo detector 23 is selected to respond adequately to energy within the bandpass of filter 22.

A more detailed discussion of the workings of the gas analysis system and the associated electronic system can be found in copending application Ser. No. 320,137, filed Jan. 2, 1973.

It can be seen that the light beam alternator periodically switches the optical path between the two selector cells 20 and 21. This path otherwise is singular and continuous from radiant source 15 to photo detector 23. The energy from the source can be collimated into a narrow beam to increase the efficiency of the alternator. Alternatively, high efficiency can be achieved by focusing the source at a point near mirror 6.

It is preferred that chopper 16 be located on the source side of the sample region 18. Quite often the sample region contains hot gasses, as for example in a smoke stack. Such gasses will produce infrared emission not associated with the source 15. If chopper 16 were omitted or located on the other side of the sample region, there would be no way for the detector to distinguish between radiation from the source or sample. The system shown permits the detector output to be evaluated in terms of chopped radiation thereby greatly reducing sensitivity of the system to sample or background emission.

Since a single narrow beam is employed and since the detector can distinguish the source by virtue of its chopping frequency, many troublesome variables are eliminated. These include source variations, particulate matter in the sample region, dirt particles in the system (except for dirt inside the light beam alternator itself), and position drift in the optics exterior to the light beam alternator.

DESCRIPTION OF THE PREFERRED EMBODIMENT

Figure 7:
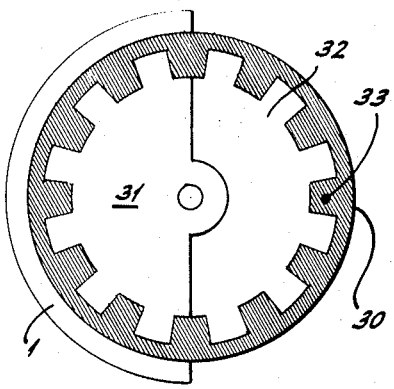
FIG. 7 shows the mirror of FIG. 2 with an additional mask to perform chopping of the source beam.

FIG. 7 shows a modified version of the mirror of FIGS. 1 and 2. The half circular mirror 1 carries an opaque mask 30. The area inside the mask is reflective in region 31 over the mirror and transmissive in region 32. The mask is arranged so that as the mirror rotates the input optical beam will be interrupted by the inwardly extending mask segments or teeth. Point 33 indicates the region of imput beam impingement. For the illustration shown, if the alternator operates at a 30 Hz rate the mask will produce beam chopping at a 360 Hz rate. However, other rates can be achieved by using more or fewer teeth in mask 30. Desirably the mask will be opaque and non-reflective to the optical energy being employed.

The location of the mask as shown with respect to the mirror, constitutes an advantage. It will be noted that a mask tooth extends half-way over the mirror edges. This means that the source is off by virtue of the chopper action during the alternator switching interval. This feature avoids alternator switching transients that may occur when switching is accomplished while the mirror is illuminated. Accordingly it is preferred that the mask not be positioned so that the mirror edges fall between the teeth.

Figure 8:
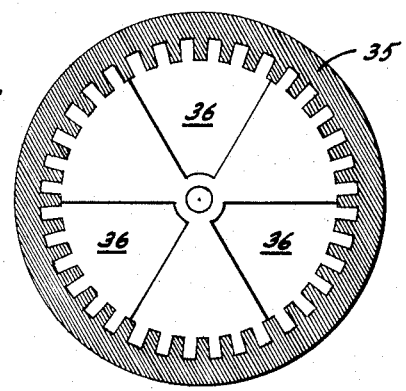
FIG. 8 shows the mirror of FIG. 3 with a chopping mask.

FIG. 8 shows the application of a mask to the mirror of FIG. 3. The chopping rate ratio is the same as for FIG. 7. While the device of FIG. 8 would be limited to a smaller beam diameter than the FIG. 7 device, the overall diameter could be made much larger because it is balanced and need only rotate at one third the rate of the FIG. 5 device. A 24:1 chopping ratio has been found useful and this involves twice as many teeth as shown in FIGS. 7 and 8. This gives a 720 Hz chopping rate for a 30 Hz alternator rate.

In an operating system the combined chopper and alternator would be located where chopper 16 is shown in FIG. 6. The bandpass filter 22 and photo detector 23 would be located next to the sample region 18. System operation would be the same as was described above for FIG. 6.

The chopper masks of FIGS. 7 and 8 are shown having teeth the same width as the open spaces. This gives a 50 percent transmission duty cycle. While this duty cycle is preferred, for some applications there may be cases where some other value is desired. For example, if the teeth are made narrower, the duty cycle increases and the average transmitted optical power rises. However the tooth width should not be made smaller than the transmitted radiant beam diameter.

Figure 9:
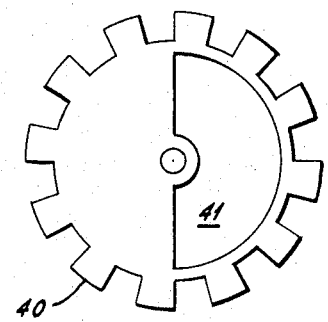
FIG. 9 shows an alternative mirror structure having an integral light chopper.
Figure 10:
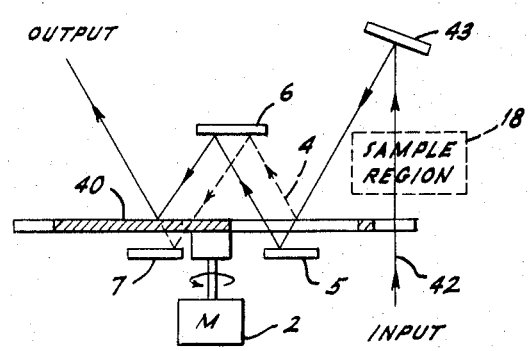
FIG. 10 shows an optical system employing the mirror of FIG. 9.

FIG. 9 shows an alternate form of combined rotating mirror and chopper. In this version wheel 40 is a front surface reflector having a notched outer edge and an open segment 41. This structure is operated in a system shown in FIG. 10. The input radiant beam is applied along path 42 where it is chopped by rotating wheel 40. The chopped beam is then passed through sample region 18 and reflected by mirror 43 onto the face of wheel 40. From this point on the system operates as was described in connection with FIG. 1. By adding mirror 43 and the serrations to the edge of the rotating mirror, the masks employed in the showings of FIGS. 7 and 8 can be dispensed with.

While the light beam alternator has been described separately and in combination with a high frequency chopper, alternatives will occur to a person skilled in the art. It is intended that our invention be limited only by the following claims:

We claim:

1. A light beam alternator comprising:
   a plane sectored mirror having a center about which it may be rotated, and having at least one high transmissivity sector and at least one high reflectivity sector,
   means for rotating said sectored mirror on an axis perpendicular to its plane, said axis passing through said center,
   a plurality of fixed planar mirrors having reflective surfaces, spaced from, parallel to, and facing said sectored mirror, said fixed mirrors being disposed on both sides of said sectored mirror in an array,
   light beam entrance and exit paths for said alternator so arranged and oriented in respect to said fixed and sectored mirrors that a light beam directed into said alternator along said entrance path intersects the plane of said sectored mirror at least twice before it exits from said alternator along said exit path and
   a pair of selector cells located between said sectored mirror and one of said planar mirrors and positioned to be alternately illuminated by said light beam as said sectored mirror is rotated.

2. The apparatus of claim 1 wherein all mirrors are front surface reflectors.

3. The apparatus of claim 1 wherein one cell of said pair of selector cells is replaced by an attenuator alternately illuminated by said light beam.

4. The apparatus of claim 1 further including light chopping means for interrupting said beam at an integral multiple of the rate at which said alternator operates.

5. A light beam alternator having an input beam path and an output beam path comprising:
   a plane sectored mirror having a center about which it may be rotated and having alternate sectors of high reflectivity and high transmissivity;
   means for rotating said sectored mirror about an axis that is perpendicular to the plane of said sectored mirror, said axis passing through said center;
   a first planar mirror surface disposed with its face parallel to the surface of said sectored mirror and positioned so that said input beam path inpinges on it through said sectored mirror only when a high transmissivity sector is interposed;
   a second planar mirror surface, disposed on the opposite side of said sectored mirror, oriented with its face parallel with the face of said first planar mirror and positioned to intercept the reflected input beam path; and
   a third planar mirror surface, coplanar with said first planar mirror, and positioned to reflect the beam reflected from said second planar mirror along said output beam path; whereby the multiple reflections provide offset beam transit paths inside said alternator as said sectored mirror rotates.

6. The apparatus of claim 5 wherein all mirrors are front surface reflectors.

7. The apparatus of claim 5 further including gas filled selector cells alternately exposed to said input beam path in response to the rotation of said sectored mirror.

8. The apparatus of claim 7 further including light chopping means for interrupting said beam at a multiple of the rate at which said alternator operates.

9. The apparatus of claim 8 wherein said light chopping means comprises:
   a ring of projections arrayed around the periphery of said sectored mirror and extending into said input beam path.

* * * * *